June 7, 1955

W. P. NIXON 2,710,359

AUTOMATIC CLUTCH AND BRAKE

Filed Sept. 17, 1952

INVENTOR.
WILLIAM P. NIXON
BY

ATTORNEY

*INVENTOR.*
WILLIAM P. NIXON
BY
*ATTORNEY*

United States Patent Office 2,710,359
Patented June 7, 1955

2,710,359

AUTOMATIC CLUTCH AND BRAKE

William P. Nixon, Bedford, Ohio, assignor to Jack & Heintz, Inc., Cleveland, Ohio, a corporation of Delaware Application September 17, 1952, Serial No. 309,974

7 Claims. (Cl. 310—76)

This invention relates in general to combination automatic clutch and brake mechanisms and more particularly to improvements in such mechanisms as applied to electric motor operated output shafts.

One of the primary objects of the invention is to provide a simple and efficient self-contained combination automatic clutch and brake unit whereby when the electric motor is deenergized, the output shaft is both declutched from drive by motor armature and the output shaft and load are effectively braked virtually instantaneously.

Another object is to provide, in such a self-contained unit, means whereby flux from the field core of the motor may be utilized to energize the operating armature of the magnetic clutch and brake unit, without the necessity of a separate solenoid, or the like, for such purposes.

Another object is to provide in such a clutch and brake unit, positive tooth engagement of relatively axially movable elements, both for motor drive of the output shaft and for braking of the output shaft and load, rather than merely relying upon friction surfaces for either or both of such functions.

With the foregoing and other objects in view, the invention resides in the combination of parts and in the details of construction hereinafter set forth in the following specification and appended claims, certain embodiments thereof being illustrated in the accompanying drawings, in which:

Figure 1:
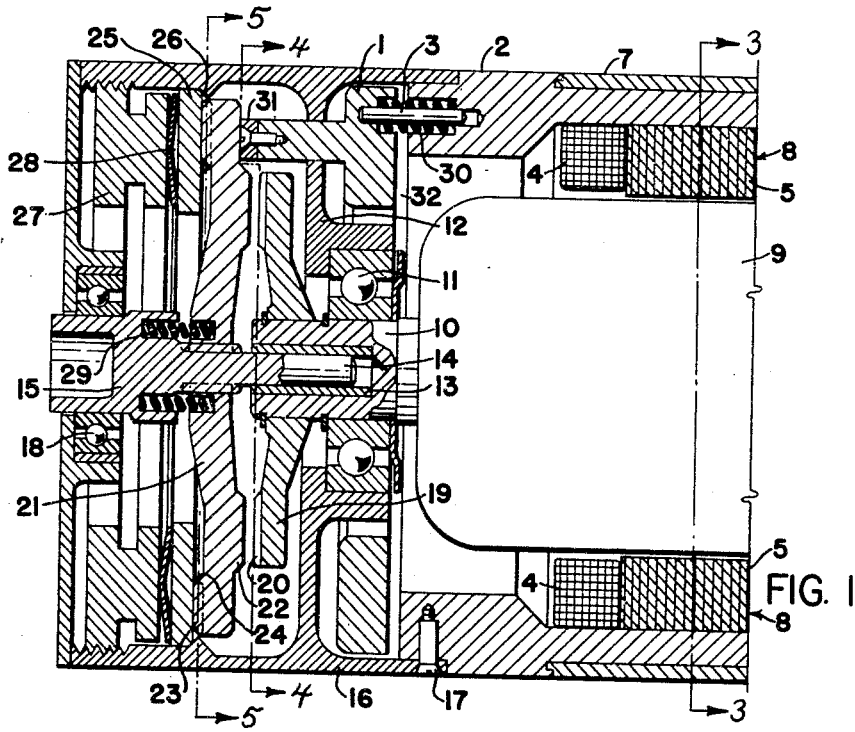
Figure 1 is a view in longitudinal section, showing my invention, there being shown a part of an electric motor, a motor shaft, an output shaft and the clutch and brake unit with its operating armature, the clutch and brake elements being shown in position whereby the output shaft is declutched and braked.

Referring more particularly to the drawings, I have shown a magnet armature 1 which is axially slidably piloted into magnetic pole mounts 2 by pins 3, so as to provide the only low reluctance path for flux created by windings 4 on poles 5. Poles 5 are mounted on magnetic pole mounts 2, which, in turn, are mounted in a non-magnetic housing 7.

The motor is shown as having a stator 8 and a rotor 9 with a motor shaft 10 supported for a rotation in a bearing 11 carried in a housing wall 12. Shaft 10 is carried on internal bearing sleeve 13 to rotatably support a reduced end 14 of an output shaft 15 in non-driving relationship. The output shaft 15 and the clutch and brake unit are housed in a housing 16 releasably secured by bolts 17 to the motor housing assembly. Output shaft 15 is rotatably supported by bearing 18.

Splined to motor shaft 10 for rotational drive thereby is a face type gear 19 with gear teeth 20 on the output side thereof. On the output shaft 15 is longitudinally axially movably splined a face type gear 21. This gear 21 has teeth 22 on its one axial side for meshing with teeth 20 of gear 19. On its other axial side, gear 21 has teeth 23 for meshing with teeth 24 of a brake block 25. Brake block 25 is resiliently urged axially against a housing lip 26 by a manually adjustable screw plug 27 and a spring 28 between plug 27 and block 25.

Figure 1 shows the relative positions of the parts of the clutch and brake unit, when the motor is deenergized, so as to simultaneously declutch the output shaft from the motor shaft and brake the output shaft and the load. The opposed axial faces of output shaft 15 and gear 21 are recessed to receive the two ends of compression coil springs 29. The opposed axial faces of magnetic pole mounts 2 and the magnet armature 1 have axial recesses to receive the piloting pins 3 and compression coil springs 30 surrounding each pin. With the motor deenergized, the magnetic attraction on the armature 1 has ceased, leaving the relatively stronger springs 30 free to overpower the relatively weaker springs 29, and, through the non-magnetic pads 31 on the armature 1, force gear 21 out of engagement with gear 19 to declutch the output shaft, and force gear 21 into engagement with the resiliently backed gear block 25, to brake the output shaft. This movement of the armature 1 establishes an air gap 32 between the armature 1 and the magnetic pole mounts 2.

Figure 2:
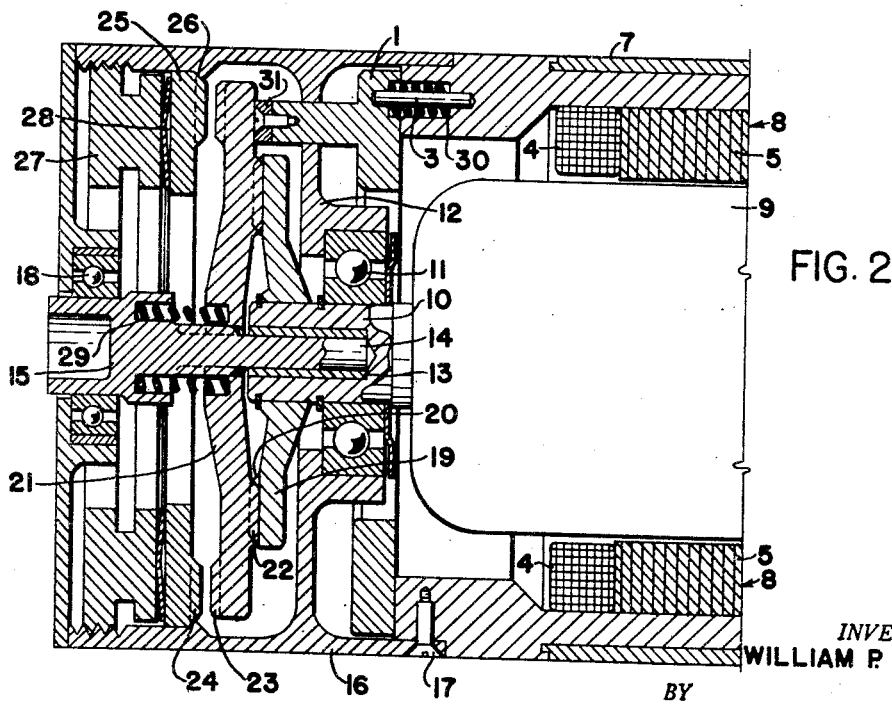
Figure 2 is a view similar to Figure 1, showing the brake released and the output shaft clutched to be driven by the motor shaft.
Figure 3:
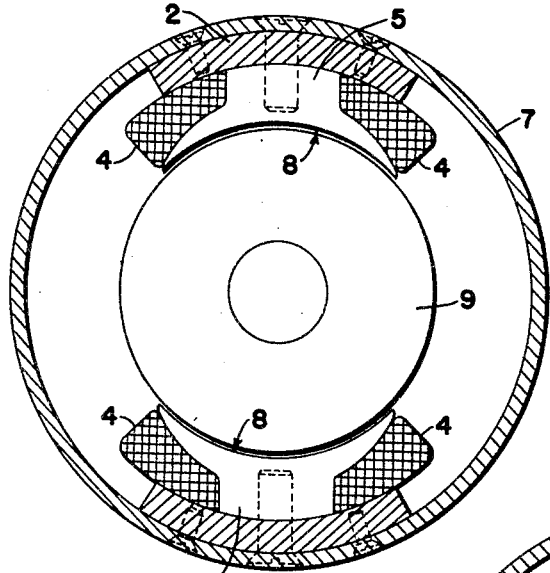
Figure 3 is a view in section taken along lines 3—3 of Figure 1.
Figure 4:
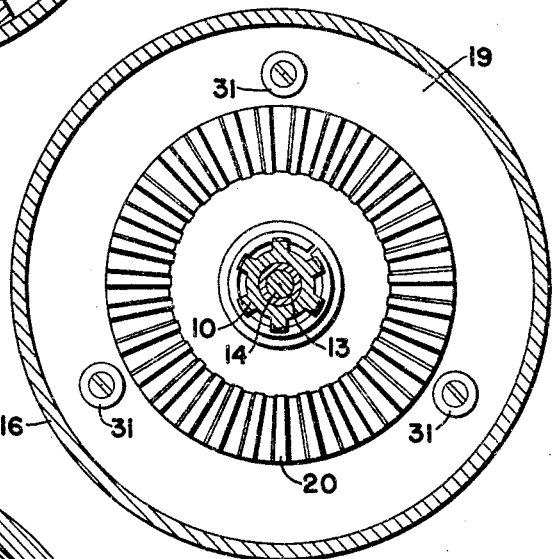
Figure 4 is a view in section taken along line 4—4 of Figure 1.
Figure 5:
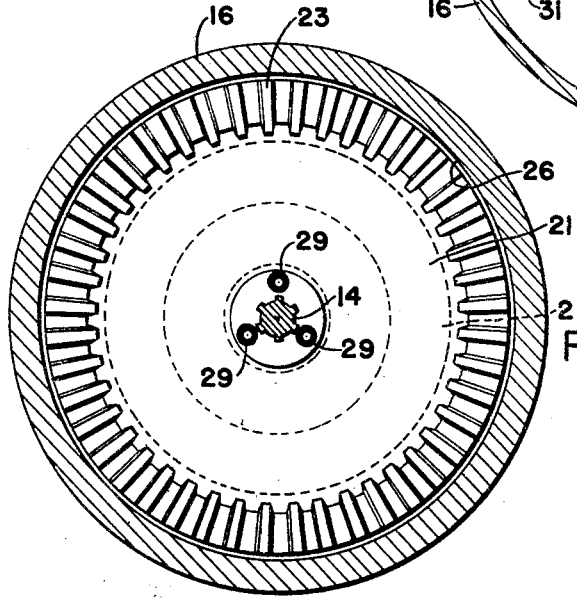
Figure 5 is a view in section taken along line 5—5 of Figure 1.

Upon energization of the motor, magnetic flux is established, and the only good magnetic path is across the air gap 32, because the motor housing 7 is non-magnetic. This magnetically pulls armature 1 to the right to close the air gap 32 and assume the position shown in Figure 2. This action overpowers the opposing action of springs 30 and with the assistance of springs 29, the double face gear 21 is disengaged from the brake gear 25 and is brought into engagement with motor shaft gear 19. This clutches output shaft 15 with motor shaft 10, so as to be driven thereby, and releases the brake from the output shaft.

It follows that when the motor circuit is opened, the current and the holding power of the magnet fall to zero, so that springs 30 overpower springs 29 to bring the clutch and brake unit into the position shown in Figure 1 to declutch and brake the output shaft.

It will thus be seen that I have provided a simple and effective self-contained automatic clutch and brake unit that is directly responsive to energization and deenergization of an electric motor, for effecting a drive between the motor shaft and an output shaft and releasing the brake upon the latter when the motor is started, and, upon energization of the motor, for automatically releasing the brake on the output shaft and clutching it into driven engagement by the motor shaft. By my use of the available flux, I eliminate the need for an additional magnet coil. Because of springs 30 overpowering springs 29, the output shaft is effectively declutched from the motor shaft. Even if the motor shaft coasts after the motor circuit is open, the only load to be braked, in addition to the load driven by output shaft, is that of the output shaft 15 and the double face type gear 21 carried thereby.

I claim:

1. In combination with an electric motor having a motor shaft driven thereby, an output shaft arranged in non-driven relationship with said motor shaft, an automatic combination self-contained clutch and brake unit for clutching said motor shaft into driving engagement with said output shaft and for releasing the brake from said output shaft when said motor is energized and also for declutching said output shaft from said motor shaft and for braking said output shaft when said motor is deenergized, a housing for said clutch and brake unit, said clutch and brake unit comprising a gear brake carried by said housing, a gear rigid with said motor shaft, a double face gear axially slidably splined to said output shaft, an axially movable magnetic armature and resilient means for normally holding said double face gear out of engagement with said motor shaft gear and for holding said double face gear in engagement with said brake gear when said motor is deenergized, said magnetic armature being responsive to flux produced by said motor, when energized, to overpower said resilient means to disengage said double face gear from said brake gear, relatively weaker resilient means for urging said double face gear into mesh with said motor shaft carried gear to clutch said motor shaft and said output shaft into driving engagement, said other, and relatively stronger, resilient means being adapted to normally urge said armature away from said motor to provide an air gap therebetween when said motor is deenergized, said motor, upon energization, being adapted to establish a magnetic flux flow across said air gap to magnetically attract said armature toward said motor, against the action of said relatively stronger resilient means, to withdraw said double face gear out of engagement with said brake gear, to release the brake on said output shaft, and to force said double face gear into engagement with said motor shaft gear, to establish a drive between said motor shaft and said output shaft.

2. In combination with an electric motor having a motor shaft driven thereby, an output shaft arranged in non-driven relationship with said motor shaft, an automatic combination self-contained clutch and brake unit for clutching said motor shaft into driving engagement with said output shaft and for releasing the brake from said output shaft when said motor is energized and also for declutching said output shaft from said motor shaft and for braking said output shaft when said motor is deenergized, a housing for said clutch and brake unit, said clutch and brake unit comprising a gear brake carried by said housing, a gear rigid with said motor shaft, a double face gear axially slidably splined to said output shaft, an axially movable magnetic armature and resilient means for normally holding said double face gear out of engagement with said motor shaft gear and for holding said double face gear in engagement with said brake gear when said motor is deenergized, said magnetic armature being responsive to flux produced by said motor, when energized, to overpower said resilient means to disengage said double face gear from said brake gear, relatively weaker resilient means for urging said double face gear into mesh with said motor shaft carried gear to clutch said motor shaft and said output shaft into driving engagement, said other, and relatively stronger, resilient means being adapted to normally urge said armature away from said motor to provide an air gap therebetween when said motor is deenergized, said motor, upon energization, being adapted to establish a magnetic flux flow across said air gap to magnetically attract said armature toward said motor, against the action of said relatively stronger resilient means, to withdraw said double face gear out of engagement with said brake gear, to release the brake on said output shaft, and to force said double face gear into engagement with said motor shaft gear, to establish a drive between said motor shaft and said output shaft, said unit, upon deenergization, being adapted to magnetically release said armature so that the latter is forced by said relatively stronger resilient means to move said double face gear out of engagement with said motor shaft gear, to declutch said output shaft from said motor shaft, and to force said double face gear into engagement with said brake gear, to brake said output shaft.

3. In combination with an electric motor having a motor shaft driven thereby, an output shaft arranged in non-driven relationship with said motor shaft, an automatic combination self-contained clutch and brake unit for clutching said motor shaft into driving engagement with said output shaft and for releasing the brake from said output shaft when said motor is energized and also for declutching said output shaft from said motor shaft and for braking said output shaft when said motor is deenergized, a housing for said clutch and brake unit, said clutch and brake unit comprising a magnetic armature axially slidably piloted into engagement with the magnetic pole mounts of said motor, a face type gear rigid with said motor shaft, a double face type gear splined to be axially movable on said output shaft and having sets of gear teeth on both of its axially opposite faces, one set for engagement with the gear carried by said motor shaft and a resiliently backed adjustable brake block carried by said housing and provided with gear teeth to engage the other set of teeth of said double face type gear.

4. In combination with an electric motor having a motor shaft driven thereby, an output shaft arranged in non-driven relationship with said motor shaft, an automatic combination self-contained clutch and brake unit for clutching said motor shaft into driving engagement with said output shaft and for releasing the brake from said output shaft when said motor is energized and also for declutching said output shaft from said motor shaft and for braking said output shaft when said motor is deenergized, a housing for said clutch and brake unit, said clutch and brake unit comprising a magnetic armature axially slidably piloted into engagement with the magnetic pole mounts of said motor, a face type gear rigid with said motor shaft, a double face type gear splined to be axially movable on said output shaft and having sets of gear teeth on both of its axially opposite faces, one set for engagement with the gear carried by said motor shaft and a resiliently backed adjustable brake block carried by said housing and provided with gear teeth to engage the other set of teeth of said double face type gear, resilient means carried by said output shaft for urging said double face type gear out of mesh with said brake gear and into mesh with said motor shaft carried gear to clutch said motor shaft and said output shaft into driving engagement.

5. In combination with an electric motor having a motor shaft driven thereby, an output shaft arranged in non-driven relationship with said motor shaft, an automatic combination self-contained clutch and brake unit for clutching said motor shaft into driving engagement with said output shaft and for releasing the brake from said output shaft when said motor is energized and also for declutching said output shaft from said motor shaft and for braking said output shaft when said motor is deenergized, a housing for said clutch and brake unit, said clutch and brake unit comprising a magnetic armature axially slidably piloted into engagement with the magnetic pole mounts of said motor, a face type gear rigid with said motor shaft, a double face type gear splined to be axially movable on said output shaft and having sets of gear teeth on both of its axially opposite faces, one set for engagement with the gear carried by said motor shaft and a resiliently backed adjustable brake block carried by said housing and provided with gear teeth to engage the other set of teeth of said double face type gear, resilient means carried by said output shaft for urging said double face type gear out of mesh with said brake gear and into mesh with said motor shaft carried gear to clutch said motor shaft and said output shaft into driving engagement, relatively stronger resilient means carried by said pole mounts for urging said armature away from said pole mounts to provide an air gap therebetween and for urging said double face gear out of engagement with said motor shaft carried gear and into engagement with said brake gear as long as said motor remains deenergized.

6. In combination with an electric motor having a motor shaft driven thereby, an output shaft arranged in non-driven relationship with said motor shaft, an automatic combination self-contained clutch and brake unit for clutching said motor shaft into driving engagement with said output shaft and for releasing the brake from said output shaft when said motor is energized and also for declutching said output shaft from said motor shaft and for braking said output shaft when said motor is deenergized, a housing for said clutch and brake unit, said clutch and brake unit comprising a magnetic armature axially slidably piloted into engagement with the magnetic pole mounts of said motor, a face type gear rigid with said motor shaft, a double face type gear splined to be axially movable on said output shaft and having sets of gear teeth on both of its axially opposite faces, one set for engagement with the gear carried by said motor shaft and a resiliently backed adjustable brake block carried by said housing and provided with gear teeth to engage the other set of teeth of said double face type gear, resilient means carried by said output shaft for urging said double face type gear out of mesh with said brake gear and into mesh with said motor shaft carried gear to clutch said motor shaft and said output shaft into driving engagement, relatively stronger resilient means carried by said pole mounts for urging said armature away from said pole mounts to provide an air gap therebetween and for urging said double face gear out of engagement with said motor shaft carried gear and into engagement with said brake gear as long as said motor remains deenergized, said motor, upon energization, being adapted to establish a magnetic flux flow across said air gap, and, with the assistance of said output shaft carried resilient means, being adapted to overpower said relatively stronger pole mount carried resilient means and to magnetically attract said armature toward said pole mount to close said air gap and to withdraw said double face gear out of engagement with said brake gear, to release the brake on said output shaft, and to force said double face gear into engagement with said motor shaft gear, to establish a drive between said motor shaft and said output shaft.

7. In combination with an electric motor having a motor shaft driven thereby, an output shaft arranged in non-driven relationship with said motor shaft, an automatic combination self-contained clutch and brake unit for clutching said motor shaft into driving engagement with said output shaft and for releasing the brake from said output shaft when said motor is energized and also for declutching said output shaft from said motor shaft and for braking said output shaft when said motor is deenergized, a housing for said clutch and brake unit, said clutch and brake unit comprising a magnetic armature axially slidably piloted into engagement with the magnetic pole mounts of said motor, a face type gear rigid with said motor shaft, a double face type gear splined to be axially movable on said output shaft and having sets of gear teeth on both of its axially opposite faces, one set for engagement with the gear carried by said motor shaft and a resiliently backed adjustable brake block carried by said housing and provided with gear teeth to engage the other set of teeth of said double face type gear, resilient means carried by said output shaft for urging said double face type gear out of mesh with said brake gear and into mesh with said motor shaft carried gear to clutch said motor shaft and said output shaft into driving engagement, relatively stronger resilient means carried by said pole mounts for urging said armature away from said pole mounts to provide an air gap therebetween and for urging said double face gear out of engagement with said motor shaft carried gear and into engagement with said brake gear as long as said motor remains deenergized, said motor, upon energization, being adapted to establish a magnetic flux flow across said air gap, and, with the assistance of said output shaft carried resilient means, being adapted to overpower said relatively stronger pole mount carried resilient means and to magnetically attract said armature toward said pole mount to close said air gap and to withdraw said double face gear out of engagement with said brake gear, to release the brake on said output shaft, and to force said double face gear into engagement with said motor shaft gear, to establish a drive between said motor shaft and said output shaft, said unit, upon motor deenergization, being adapted to discontinue flow of said magnetic flux across said air gap and to have its pole mount carried resilient means overpower said output shaft carried resilient means and force said double face gear out of mesh from said motor shaft gear, to declutch said output shaft from said motor shaft, and to force said double face gear into mesh with said brake gear, to brake said output shaft.

References Cited in the file of this patent

UNITED STATES PATENTS

| 1,555,985 | Kaseberg | Oct. 6, 1925 |
| 2,408,808 | Paulus et al. | Oct. 8, 1946 |
| 2,572,700 | Chapman et al. | Oct. 23, 1951 |

FOREIGN PATENTS

| 419,835 | Great Britain | Nov. 20, 1934 |